(12) United States Patent
Cieliebak et al.

(10) Patent No.: US 7,343,337 B1
(45) Date of Patent: Mar. 11, 2008

(54) PORTFOLIO THEORY METHOD OF MANAGING OPERATIONAL RISK WITH RESPECT TO NETWORK SERVICE-LEVEL AGREEMENTS

(75) Inventors: Kai Cieliebak, Menlo Park, CA (US); Beat Liver, Adiswil (CH)

(73) Assignee: International Business Machines Corporation, Armonk, NY (US)

( * ) Notice: Subject to any disclaimer, the term of this patent is extended or adjusted under 35 U.S.C. 154(b) by 839 days.

(21) Appl. No.: 09/699,262

(22) Filed: Oct. 27, 2000

Related U.S. Application Data

(60) Provisional application No. 60/162,383, filed on Oct. 29, 1999.

(51) Int. Cl.
*G06Q 40/00* (2006.01)

(52) U.S. Cl. .................... 705/36 R; 705/7; 705/10

(58) Field of Classification Search .................. 705/36, 705/36 R, 7, 10
See application file for complete search history.

(56) References Cited

U.S. PATENT DOCUMENTS

| | | | | |
|---|---|---|---|---|
| 5,884,287 A | * | 3/1999 | Edesess | 705/36 |
| 6,003,018 A | * | 12/1999 | Michaud et al. | 705/36 |

* cited by examiner

*Primary Examiner*—Jagdish N Patel
(74) *Attorney, Agent, or Firm*—Douglas W. Cameron; Anne VAchon Dougherty

(57) ABSTRACT

A method for managing operational risk and return with respect to a portfolio of service-level agreements is provided, wherein the method uses a noncompliance risk measure to calculate risk; and wherein, principals of portfolio theory are applied to characterize the portfolio for comparison with other possible portfolios.

4 Claims, 12 Drawing Sheets

PORTFOLIO THEORY METHOD OF MANAGING OPERATIONAL RISK WITH RESPECT TO NETWORK SERVICE-LEVEL AGREEMENTS

CROSS REFERENCE TO RELATED APPLICATION

This application claims priority to co-pending U.S. provisional application No. 60/162,383 filed Oct. 29, 1999.

FIELD OF THE INVENTION

This invention relates to a method of managing risk, and more particularly, to a method of managing operational risk and return with respect to network service-level agreements ("SLA"s).

BACKGROUND OF THE INVENTION

In order to ensure economical network operations, providers are concerned with the following trade-off: on the one hand, better Quality of Service corresponds to higher price, thereby increasing revenue. On the other hand, if the provider guarantees higher Quality of Service and is not willing to run a higher risk, he can only accept less traffic, thereby decreasing revenue. In order to properly evaluate this trade off, the provider attempts to manage operational risk associated with non-complying network service-level agreements.

In the prior art, operators employ simple traffic engineering to meet the QoS as specified in the SLAs. For example, sensitivity analysis is carried out to determine the likelihood of violating SLAs.

Therefore, what is needed is a systematic method to evaluate risk and return with respect to network service-level agreements that can be implemented on a computer in order to provide near real time assessments of performance, thus providing more accurate risk assessments and less uncertainty.

SUMMARY OF THE INVENTION

It is therefore an object of the invention to provide a method of managing operational risk and return with respect to a portfolio of classes of service-level agreements ("SLA"s). The method executes the following steps: (1) calculating an efficient frontier that identifies efficient portfolios of SLAs using inputs such as characteristics of the production infrastructure, traffic and QoS characteristics and the price of each class of SLAs; (2) optionally, calculating a baseline efficient frontier using inputs such as market pricing and break-even (zero-profit) pricing; (3) determining the performance of the current portfolio of SLAs using a portfolio evaluator means and inputs which characterize the current portfolio; (4) evaluating performance by comparing the current portfolio and the efficient portfolios with the desired level of risk and return; and, if desired, implementing corrective action based on any desired risk and return.

BRIEF DESCRIPTION OF THE DRAWINGS

The above brief description, as well as further objects, features and advantages of the present invention will be more fully appreciated by reference to the following detailed description of the presently preferred but nonetheless illustrative embodiments in accordance with the present invention when taken in conjunction with the accompanying drawings.

DETAILED DESCRIPTION OF THE INVENTION

Glossary of Terms and Symbols $\beta C$ financial penalty per capacity unit.

C capacity C (of stem, network, link and so on)

D vector of Quality of Service classes, in case of delay $D_i$ Quality of Service offered by class i in case of delay $e(y)$ return of a portfolio $\underline{y}$ $\underline{L}$ vector of Quality of Service classes, in case of loss ratio $L_i$ vector of Quality of Service classes in case of loss ratio pcC constant term reflecting the marginal cost of providing the network.

P denotes a portfolio $\underline{p}$ price vector pc unit price for capacity C pi price of contract of type i (expected revenue)

q contracted Quality of Service of the contracts of the portfolio;

q' (expected) actual Quality of Service of a network r(y) risk of a portfolio y $r_{QoS}(y)$ Quality of Service risk, i.e., risk expressed in terms of QoS units $r_s(y)$ financial risk, i.e., risk expressed in terms of monetary units R rational numbers $R_+$ rational numbers that are greater than 0

Figure 1:
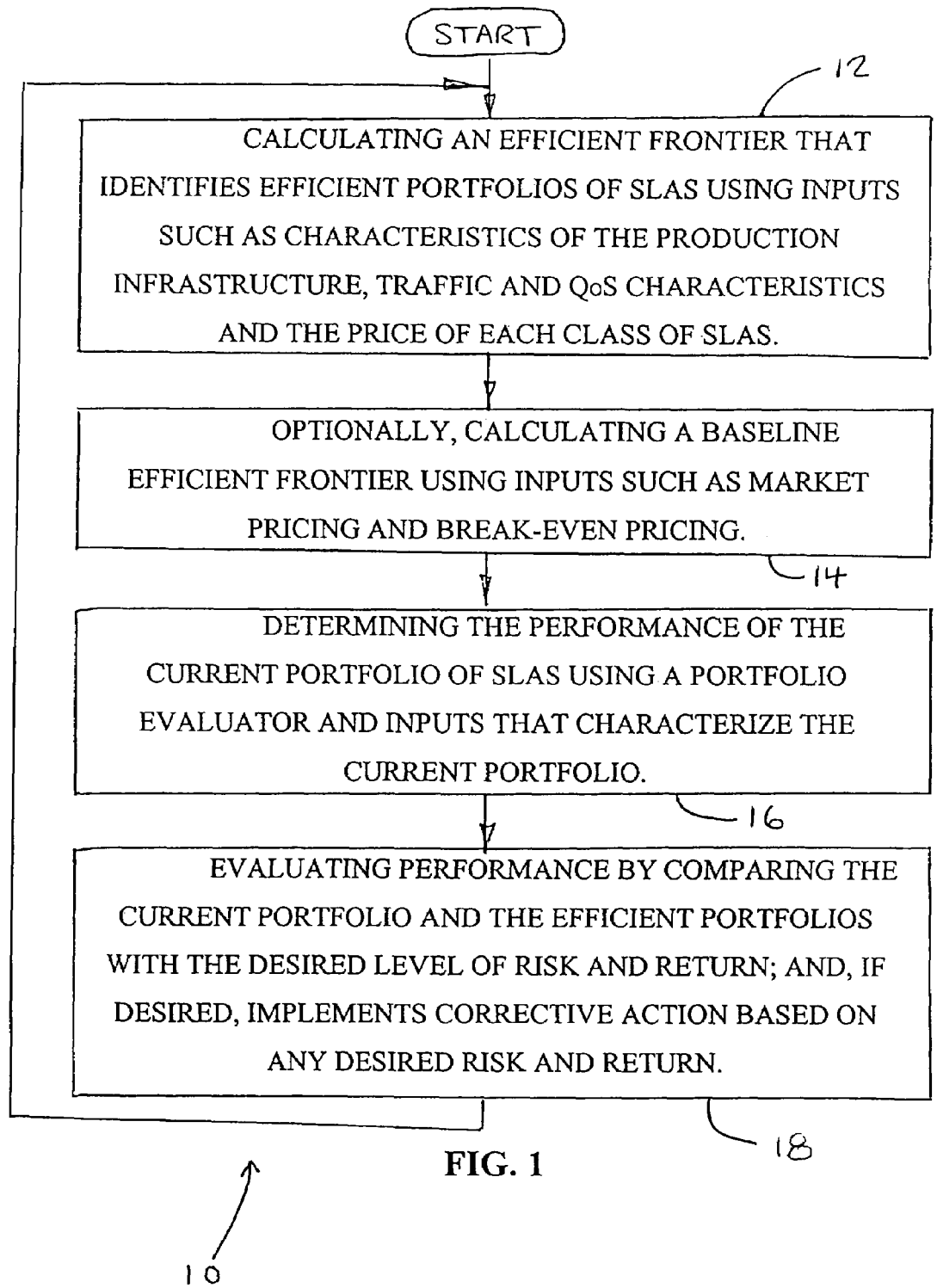
FIG. 1 is a flow diagram of the method of the invention.

$R^n$ n-dimensional space, where each dimension is of R $\underline{y}$ a portfolio, i.e., $\underline{y}=<y_1, \ldots y_i, \ldots y_n>$ $y_i$ amount of contracts (SLAs) of type i Referring now to FIG. 1, which is a flow diagram of the invention, the invention provides a method 10 and a system 20 that applies the principals set forth in detail in provisional application No. 60/162,383, hereby incorporated by reference. The method 10 manages operational risk and return with respect to a portfolio of classes of computer resource or service-level agreements ("SLA"s) by executing the following steps. In a first step 12, the method 10 calculates an efficient frontier 110 that identifies efficient portfolios of SLAs using inputs such as characteristics of the production infrastructure 138, traffic and QoS characteristics and the price of each class of SLAs. In a second step 14, the method 10, optionally, calculating a baseline efficient frontier 110 using inputs such as market pricing and zero-profit pricing. In a third step 16, the method 10 determines the performance of the current portfolio of SLAs using a portfolio evaluator 144 and inputs that characterize the current portfolio. In a fourth step 18, the method 10 evaluates performance by comparing the current portfolio and the efficient portfolios with the desired level of risk and return; and, if desired, implements corrective action based on any desired risk and return.

Figure 2:
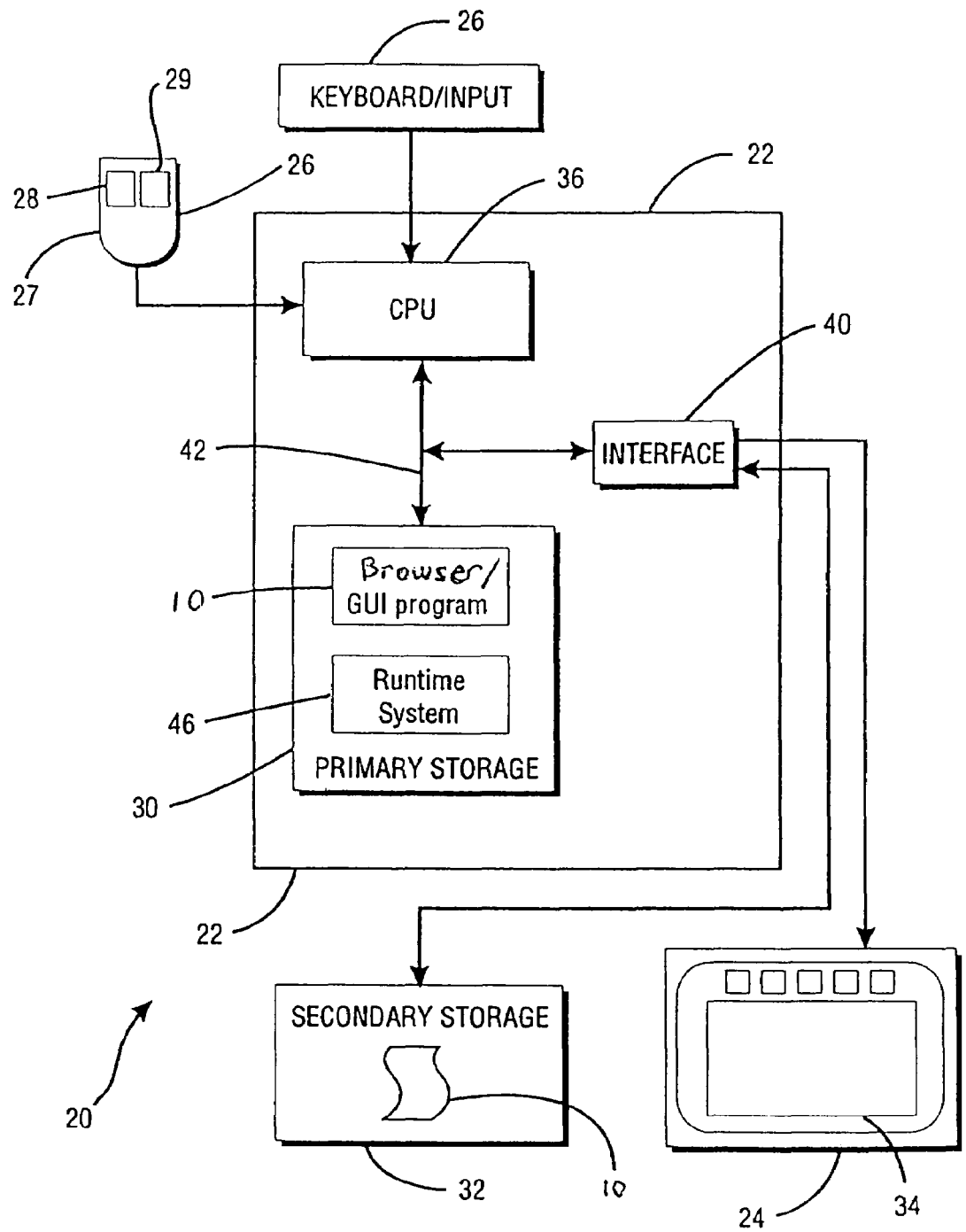
FIG. 2 is a schematic diagram of a computer device on which the invention operates.
Figure 3:
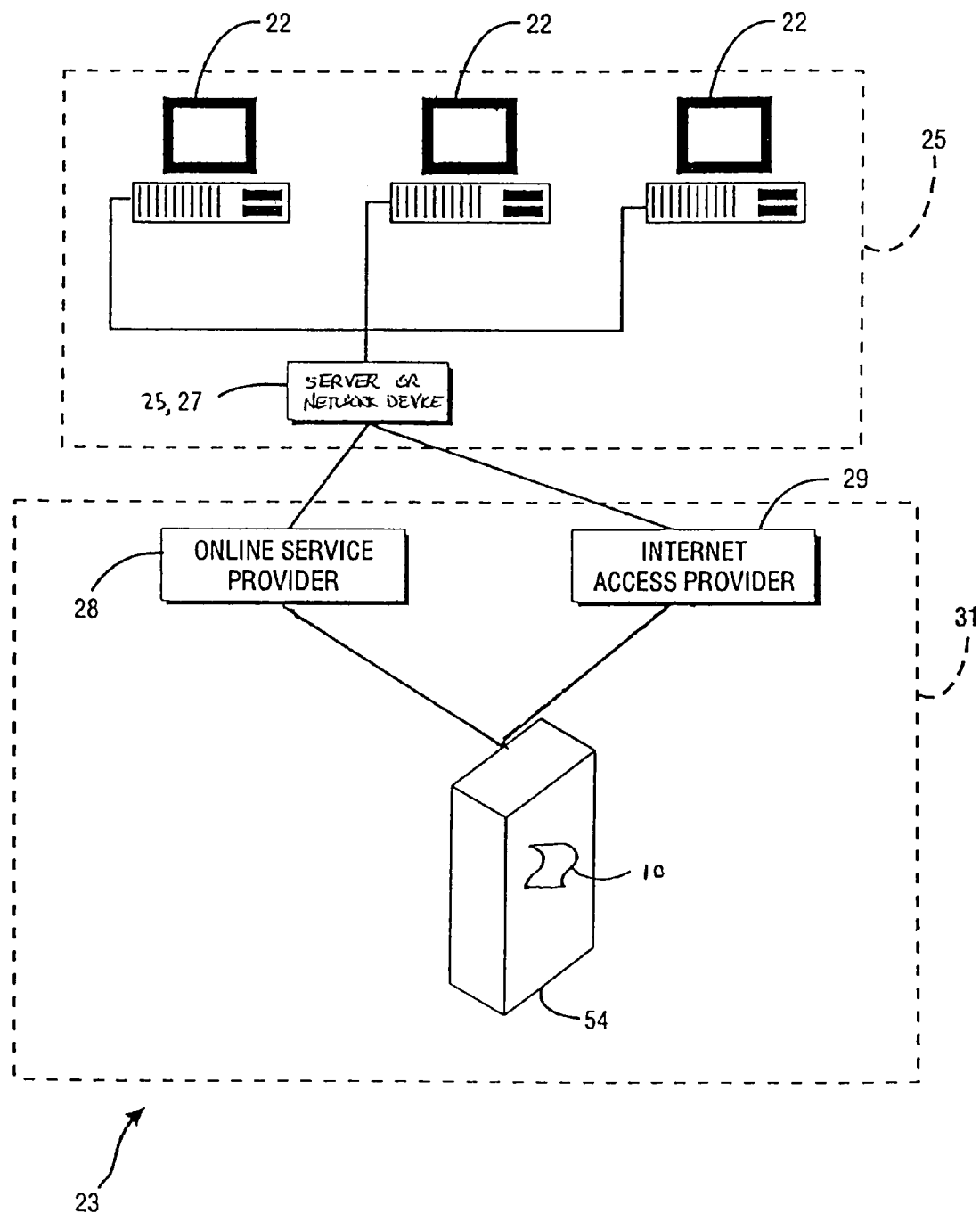
FIG. 3 is a diagram of a network on which the invention may be implemented.

Referring now to FIG. 2, which is a schematic diagram of a typical system 20 for practicing the various embodiments of the present invention, the method 10 is encoded on a computer-readable medium and operates on a computer system 20 and/or between the computer system and a server 25 or 54 (shown in FIG. 3) on an intranet or the Internet. Such a computer system 20 typically includes a computer 22, a display device 24, an input device 26 such as a keyboard, a primary storage device 30 and a secondary storage device 32. After loading of software encoded with the method 10 of the invention or after accessing the server 25 or 54 through a browser such as Internet Explore 5.0, as the case may be, the display device 24 displays a graphical user interface ("GUI") 34 for facilitating the display of text and graphics associated with the method to the user. Display devices 24 include printers and computer display screens such as a CRT, LED displays, LCDs, flat screens, screen phones, and projectors. Input devices 26 are numerous and include keyboards and pointing devices such as a mouse 27 having a left mouse button 28 and a right mouse button 29, a trackball, lightpens, thumbwheels, digitizing tablets, microphones using voice recognition software, and touch screens and pads.

Figure 8:
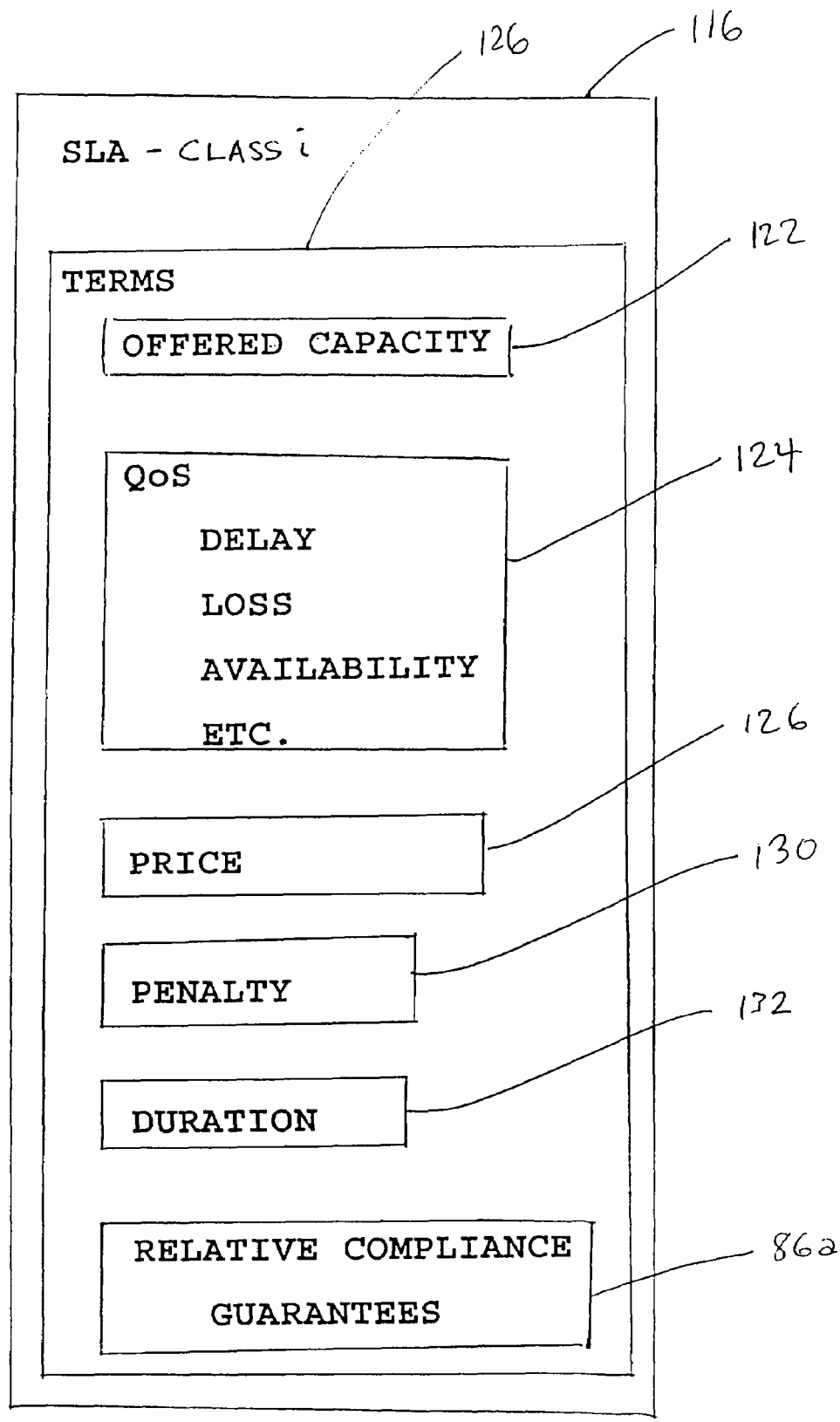
FIG. 8 is a schematic diagram of an SLA.

The GUI 34 provides input fields for data input and control of the method 10, as well as an output window for statistical displays of information, which facilitates management of the network. The method 10 accesses a database in primary storage 30, the database including information associated with each SLA, organized in a data structure including the class i of the SLA, the terms 126 of each SLA, such terms including the offered capacity 122, the Quality of Service guarantees 124 with respect to delay, loss, and availability, a price 126, a penalty 130, a duration 132, and, optionally, relative compliance guarantee(s) 86a (shown in FIG. 8).

The computer 22 includes a CPU 36 as well as other components with which all who are skilled in the art are familiar. For a detailed discussion of these components and their interaction, see U.S. Pat. No. 5,787,254, the content of which is incorporated by reference. The secondary storage 32 supports the method 10, preferably HTTP-compliant, as well as a number of Internet access tools. The CPU 36 fetches computer instructions from primary storage 30 through an interface 40 such as an input/output subsystem connected to a bus 42. The computer 22 can be, but is not limited to, an "IBM APTIVA" computer, a product of International Business Machines Corporation of Armonk, N.Y., or any computer compatible with the IBM PC computer systems based on the X86 or Pentium(™) series processor of Intel Corporation or compatible processors, or any other suitable computer. The CPU 36 utilizes an operating system that, depending on the hardware used, may be DOS, "WINDOWS 3.X", "WINDOWS XXXX", "NT", "OS/X", "AIX", "LINUX", or any other suitable operating system. The CPU 36 executes these fetched computer 11 instructions. Executing these instructions enables the CPU 36 to retrieve data or write data to the primary storage 30, display information, such as the statistical displays of the method 10, on one or more display devices 24, receive command signals from one or more input devices 26, or transfer data to secondary storage 32 or even other computer systems which collectively form a computer network 25 (shown in FIG. 3). Those skilled in the art understand that primary storage 30 and secondary storage 32 can include any type of computer storage including RAM, ROM, application specific integrated circuits ("ASIC") and storage devices that include magnetic and optical storage media such as a CD-ROM.

Where the method 10 operates on a stand-alone computer 22, the primary storage 30 stores a number of items including the method 10 and a runtime environment 46. The runtime environment 46 typically is an operating system that manages computer resources, such as memory, disk or processor time, required for the method of the invention to run. The runtime environment 46 may also be a message passing system, a microkernel, dynamic loadable linkable module(s), or any other system that manages computer resources.

Figure 4:
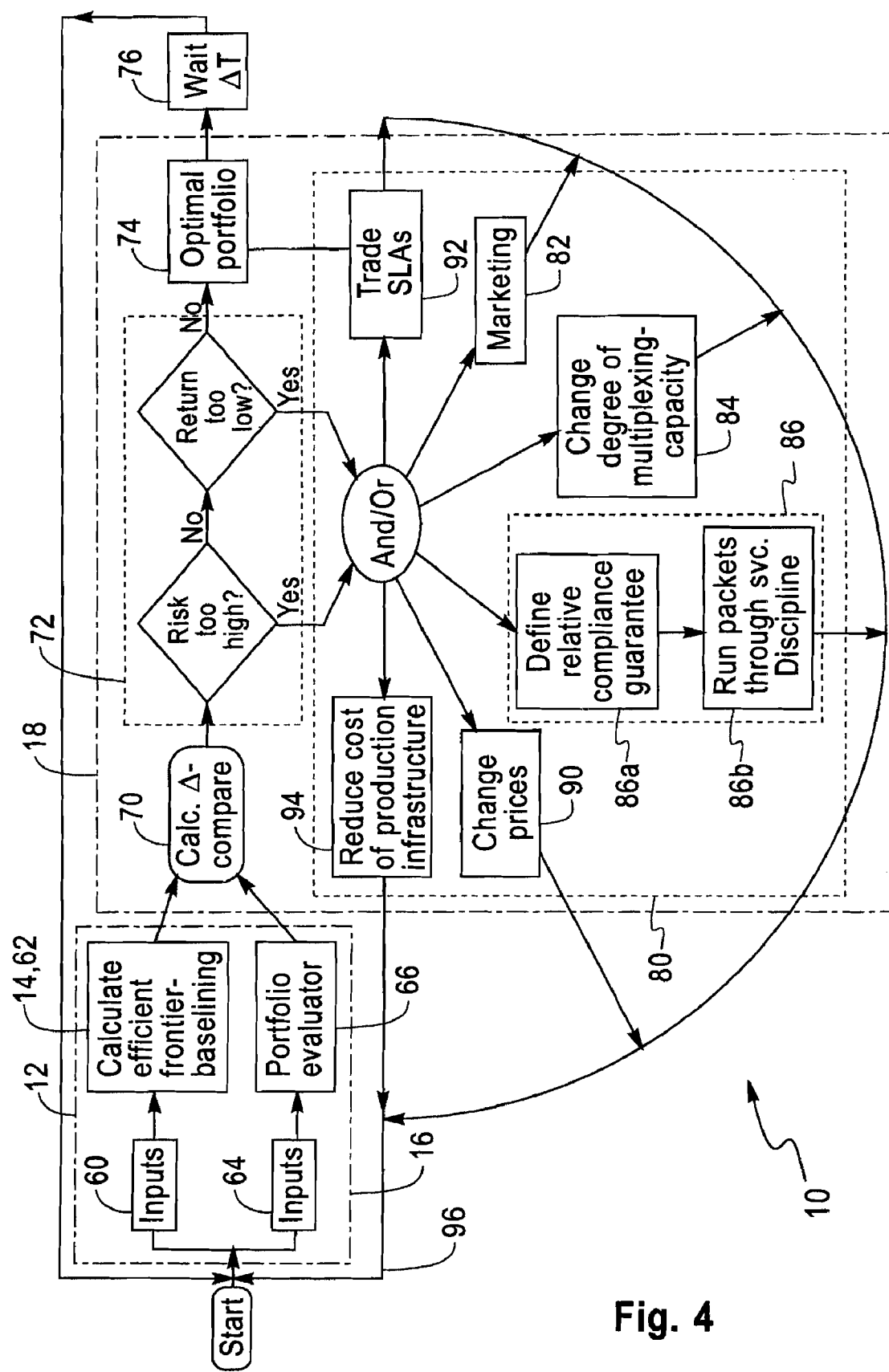
FIG. 4 is a detailed flow diagram of the method of the invention.
Figure 6:
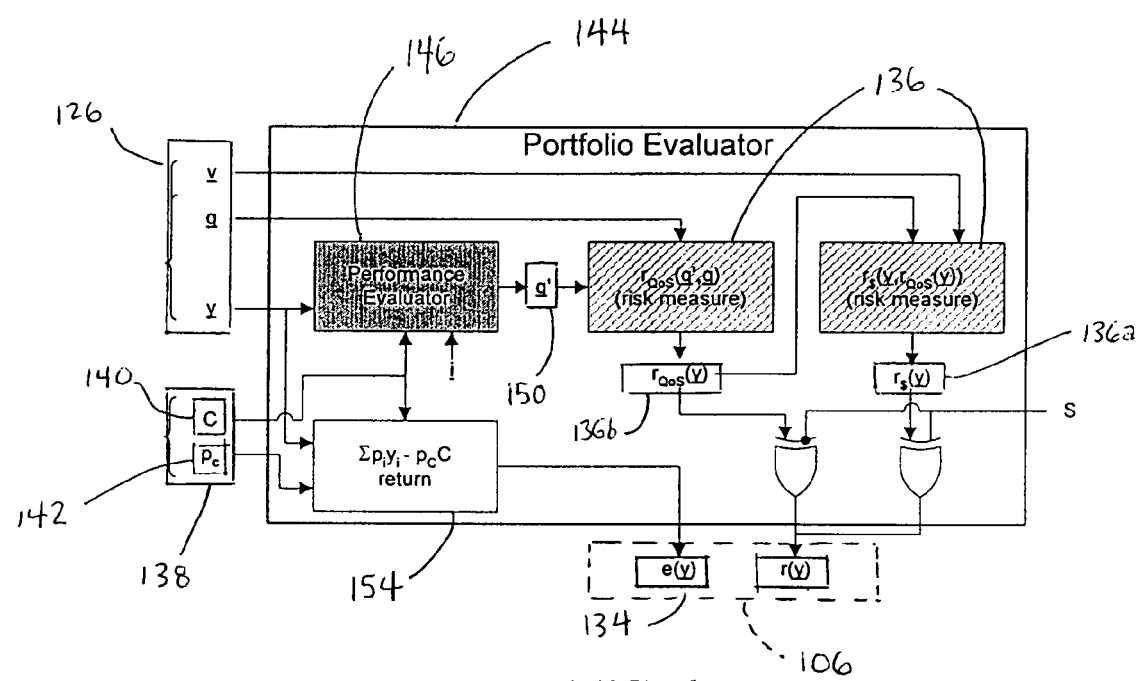
FIG. 6 is a flow chart illustrating a Portfolio Evaluator of the invention.

Now referring to FIG. 4, in which a more detailed flow diagram of the method is shown, the method 10 includes the following steps. In a first step 60, the method gathers inputs from the provider including characteristics of the production infrastructure, the QoS characteristics and price of each possible and reasonable class of SLA. In a second step 62, the method 10 calculates an efficient frontier 110 (shown in FIG. 7) that identifies efficient portfolios of SLAs. Optionally, the method 10 substitutes the actual pricing of SLAs with baseline pricing such as market pricing or break-even pricing, in order for the operator to obtain insights regarding the effects of price changes on his risk and return, with respect to the market. In a third step 64, which may run concurrently with the first and second steps 60 and 62, the method 10 gathers inputs characterizing the current portfolio of SLAs and the desired risk and return. In a fourth step 66, which may run concurrently with the first and second steps 60 and 62, the method 10 computes the risk and return of the current portfolio using a portfolio evaluator 144 (shown in FIG. 6). In a fifth step 70, the method 10 calculates the difference between the optimal portfolio identified by the efficient frontier 110 and the current portfolio. In a sixth step 72, the difference is evaluated. If actual risk and return matches the desired levels, then an acceptable portfolio 74 has been attained and the method waits a period of time ΔT (depicted in the figure by box 76), before restarting the method. Otherwise, in a seventh step 80, if actual risk is higher than desired risk or if actual return is lower than desired return, the method 10 takes corrective action. Corrective action can include adjusting marketing strategy 82, changing the degree of multiplexing, 84, defining relative compliance guarantees and running packets through a service discipline which allows transmission on the basis of priority (as defined by the guarantees specified in the SLAs), 86, changing prices, 90, trading different classes of SLAs, 92, and/or reducing the costs of the production infrastructure 94. In a seventh step 96, after an adjustment due to the selected corrective action is made to the production infrastructure, the method 10 takes new inputs, and, with the exception of the corrective action of trading SLAs, 92, the method is re-executed, by calculating a new efficient frontier 110 which is compared with actual performance, calculated by the portfolio evaluator 144, given the new parameters.

Portfolio Theory and Service-Level Agreements

In calculating the efficient frontier 110, the method 10 applies the principles of classical Portfolio theory—to be precise, the pre-CAPM (Capital Asset Pricing Model) version of portfolio theory, which was initially developed by H. Markowitz, W. Sharp and others for portfolios of classes of financial assets (shares, bonds, etc.), to provide a framework in which to describe this trade-off between risk and return for portfolios of classes of SLAs. In the classical application of portfolio theory, it is assumed that there are finitely many assets i.

Each SLA in the portfolio specifies a peak rate (e.g., bits per second) and a Quality of Service guarantee (e.g., loss rate). Associated with each portfolio is its return (relative profit) and its risk of violating any of the SLAs. This risk will be referred to as non-compliance risk (the risk that any of the Quality of Service guarantees of the sold SLAs is violated). In contrast to return, risk generally cannot be quantified in monetary terms directly. Quantifying risk in monetary terms requires two steps:

1. Risk is measured in quantities specific to the asset.
2. The measured risk levels have to be valued in terms of the contract value (e.g., money-back guarantee) specified in the contracts.

In order to separate these two steps and apply different valuation methods, risk and return are treated as independent parameters associated with portfolios.

Assuming that the set of attainable portfolios is all non-negative real numbers $R_+$ up to the number n of available assets (which is finite), each portfolio may be associated with two quantities: the (expected) return and the risk. A portfolio is called efficient if it maximizes return at a given risk, or equivalently, minimizes risk at a given return. The efficient frontier 110 is the image in the risk-return space of the set of efficient portfolios.

Treating the contracts, e.g., SLAs, of a service provider as a portfolio makes it possible to develop decision-support tools for determining the Quality of Service classes to be offered and for managing the noncompliance risk—an operational risk resulting from multiplexing (and other behaviors of a production infrastructure in operation). One such management strategy, corrective action 86, defines a new contractual parameter called relative compliance guarantees, which will be discussed in more detail later, along with a discussion of the trading of risks.

Figure 5:
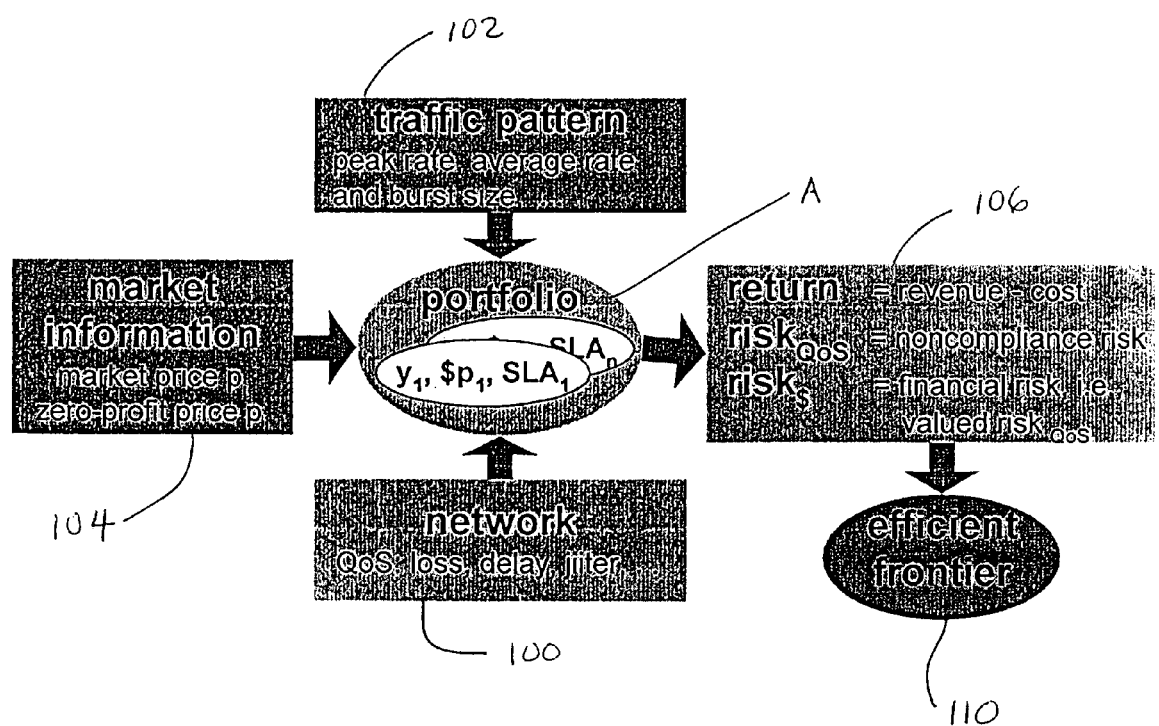
FIG. 5 is a schematic view showing portfolio theory applied to network operations.

Referring now to FIG. 5, a network service provider sells connectivity over a network 100. The provider offers n classes of service level agreements $SLA_1 \ldots SLA_n$. Each SLA specifies a connection, contract duration, traffic descriptors (peak rate, average rate, burst size, etc.) and Quality of Service guarantees (loss rate, delay, jitter, etc.). An SLA is normalized to a peak rate (or average rate) of 1 bit/s. Then the provider's portfolio of SLAs is given by a vector $y \in R_+^n$ whose component $y_i$ is the number of contracts of class i.

Associated with each portfolio are two quantities: the (expected) return e(y) and the risk r(y). The return (or profit) of a portfolio y equals $e(y) = \Sigma p_i y_i - p_c C$ where $p_i$, C and $p_c$ denote the unit price of class i, the capacity of the network and the unit price of network capacity respectively. Note that $p_c C$ is a constant term reflecting the marginal cost of providing the network. The unit price $p_c$ depends on C as networks 100 exhibit economies of scale in general. In the case of a single link, C is the link capacity.

A portfolio y entails a risk of noncompliance r(y) for the provider that depends on the traffic statistics (i.e., the traffic that is actually sent by consumers under their SLAs within the specified traffic descriptor), as well as on the network topology and capacities. There are different risk measures conceivable (as discussed below).

In order to help structure his portfolio y of SLAs, the provider must consider as inputs such factors as traffic statistics 102, market information 104, and the structure and behavior of the network 100. Then, by evaluating risk and return 106, he may determine the efficient frontier 110 (discussed in detail in connection with FIG. 7).

The set of feasible portfolios 112 (shown in FIG. 7) and the prices $p_i$ will be determined by the market demand. Once a network service provider has determined the appropriate risk measure, which may be any risk measure, and has derived a way to compute it, he can think about his operations in the terms of portfolio theory. Doing so enables the provider to (1) decide how many and which types of SLAs to offer (described above); (2) evaluate the efficiency of the current portfolio; (3) compute the efficient frontier 110; (4) quantify risk and return 106 of the current portfolio; (5) derive strategies to move towards a more efficient portfolio, and (6) determine base-line portfolios for (cost-based) zero-profit prices.

Evaluate the Efficiency of the Current Portfolio.

In order to obtain the performance characteristics of the existing production infrastructure 138, for comparison with the efficient portfolio 110 (i.e., the fourth step 18 of method 10, shown in FIG. 1), a Portfolio Evaluator 144 is provided. In addition to portfolio details and the production infrastructure (characterized by the vector i, which is fixed here and hence not further discussed), the Portfolio Evaluator 144, shown in FIG. 6, takes a Boolean variable "S", as input to select between risk measure 136a, "rs(y)", and risk measure 136b, "$r_{QoS}(y)$" (i.e., the provider decides whether he wishes to evaluate the risk of a penalty or the risk of violating a Quality of Service requirement). The Portfolio Evaluator 144 carries out the following steps:

(1) A Performance Evaluator 146 is invoked to determine the (expected) actual Quality of Service 150, "q". The Performance Evaluator 146 is a formula (if an analytical performance model exists) or a simulator. Further, the actual details of the infrastructure 138 may be used for determining performance.

(2) The portfolio risk 136, "r(y)", is computed based on actual Quality of Service 150, q', and the contracted Quality of Service 152, q, of the contracts of the portfolio using a particular risk measure 136a or 136b.

(3) The return 134, "e(y)", is computed according to the formula 154, $\Sigma p_i y_i - p_c C$, for capacity 140, "C", and capacity unit price 142, "pc", where capacity 140 is an input in both the Performance Evaluator 146 and is characteristic of the production infrastructure 138.

Risk measures 136 include the risk of noncompliance (i.e., the risk of not being able to satisfy all the Quality of Service guarantees of the sold contracts expressed as the probability that some SLAs are violated) and the expected excess quality for class i (i.e., the expected value of the difference between the delivered and contracted Quality of Service for class class i). Clearly, there are many such risk measures 136, which may be conceived. Alternatively, if the SLAs contain explicit penalties for noncompliance, risk can be measured as the expected penalty due to contract violations. Which risk measure 136 is more appropriate depends on the business implications of noncompliance: for large customers pursuing long-term relationships with the provider, the provider will strive to comply with all contracts, so he wishes to keep the probability of noncompliance at a low level. On the other hand, for small consumers frequently changing providers, the provider may deliberately risk contract violations, incorporating expected penalty as a cost in his profit function. Note that the current portfolio can be evaluated using the measured performance of the infrastructure, i.e., the Performance Evaluator 146 is a database of performance data. Such data is typically available from performance management studies or reports.

Determining risk measure 136a, $r_\$(y)$, based on specified penalties is just one method to value the risk measure 136b, $r_{QoS}(y)$, in financial terms, called a valuation method. Alternative methods are conceivable including the use of quantified user satisfaction based on, for instance, surveys and experiments. This satisfaction might depend on the market segment (e.g., business and private customers), so that it would be necessary to assign different values to each such group of contracts. A second alternative is given below.

In step 80, a provider finding out that his risk 136b, $r_{QoS}(y)$, is not zero—he sometimes violates some SLAs—takes corrective action. In corrective action 92, he may re-engineer his infrastructure including increasing the capacity C or accept the risk and pay penalties, if such are specified, or accept unsatisfied customers. Contracts with particularly high Quality of Service guarantees require more resources to guarantee them. However, these high capacity requirements are offset when portfolio mixes such high Quality of Service requirement SLAs with contracts that offer only a low Quality of Service (e.g., a high loss rate) or a low probability of compliance. This leads either to a higher return, lower risk or lower price (or a combination therefore).

Referring now to FIG. 4, in corrective action 86, wherein relative compliance guarantees are used, the method 10 of the invention implements a service discipline 86b which allows the degradation the Quality of Service of a communication flow according the Quality of Service specified in the corresponding SLA. The service discipline 86b is carried out by the network (assuming that it is possible to program the network for this purpose) Thus, the provider offers SLAs that guarantee relative compliance 86a. These relative compliance guarantees 86a are specified in terms of a noncompliance risk measure. In practice, a premium is charged for the higher compliance probability. Compliance is hence a product differentiator—a measure which may become as important as network reliability. Note that a portfolio $y$ containing SLAs with relative compliance guarantees 86a can be evaluated with the same approach to evaluate whether these relative compliance guarantees are met. Therefore, the method 10 provides this new contractual parameter, relative compliance guarantees 86a. The contractual parameter is calculated in step 70 of the method 10, in which the difference between the actual and the desired risk is equated to the relative compliance guarantee, which is added as a SLA contractual parameter, to define a lower service level. Making the risk explicit enables new valuation methods that, in particular, take advantage of the willingness of consumers to pay a certain amount for a given risk level.

Compute the Efficient Frontier

Figure 7:
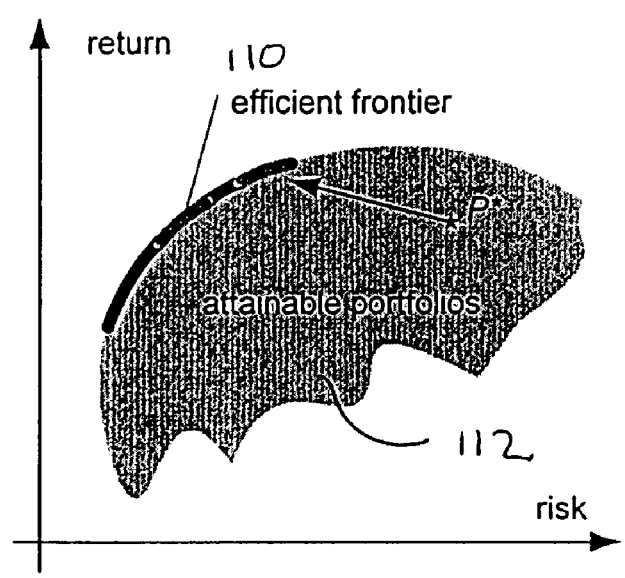
FIG. 7 is a graph of risk vs. return showing the efficient frontier.

Referring now to FIG. 7, portfolio theory is concerned with the computation and properties of the efficient frontier 110. Once the efficient frontier 110 has been determined, it is a business decision to select a portfolio on the efficient frontier, depending on the tolerable level of risk or the target return.

In order for the provider to gain an insight into where his current portfolio stands with respect to an efficient portfolio that maximizes profit for a given risk, steps 60 and 62 of the method 10 apply the principals of Portfolio Theory to calculate the efficient frontier 110. FIG. 7 shows the return-risk space with the attainable portfolios and the set of efficient portfolios, i.e., the efficient frontier 110. The efficient frontier 110 is defined by a closed-form formula, which is only possible in special cases. Assessing the efficiency of the current portfolio P* requires the computation of the efficient frontier 110. The example shown in the figure consists of three segments: two of them result from pairs of adjacent extremal points (shown in FIG. 9, identified in a closer analysis of the quasi-linearity of the risk function in Portfolio Theory), and the third consists of portfolios of a single Quality of Service class.

It is assumed that return 134 is a linear function (as defined above), equal to the summation of the product of each vector describing the portfolio multiplied by nonnegative coefficients of a price vector associated with each vector describing the portfolio, from which marginal cost (a constant) is subtracted.

Risk measures 136 can be characterized as convex and quasi-linear risk functions. A function is called convex if all sublevel sets are strictly convex, which yields the following implication, Lemma 1: If the risk measure is a convex risk function, then for every price vector and risk level, there exists a unique portfolio that maximizes return at a given risk level. The function that describes the efficient portfolios is continuous in both the certain risk level and in the price vector. The amount of the asset in the unique portfolio is zero whenever the price vector associated with that asset is also zero.

A risk function r is called quasi-linear if it depends only on the two quantities, the summation of $y_i$, the vector description of an SLA in a portfolio and the summation of the product of loss rate $L_i$ for a particular SLA i and $y_i$, for some vector $\underline{L}=(L_1, \ldots L_n) \in R_n^+$ which characterizes the quality of each SLA (where the lower loss ratio $L_i$ corresponds to better quality). Note that instead of $\Sigma y_i$, any linear function $\Sigma M_i y_i$ with positive coefficients $M_i > 0$, could have been used because the transformation $y_i \rightarrow M_i y_i$, $p_i \rightarrow p_i/M_i$ shows that this is equivalent to the case where all $M_i = 1$. If risk is expressed in terms of a special function of c, the inverse of the vector of an asset and the loss ratio, then the condition that the partial derivative of the special function with respect to c and the partial derivative with respect to the loss ratio are less than zero ensures that the risk increases with the aggregate of assets as well as with the quantity.

If n, the number of classes of SLAs, is less than 2, a quasi-linear risk function cannot be convex in the same sense as described above. The fact that the special function is convex provides the best proxy of convexity for a quasi-linear risk function.

Figure 9:
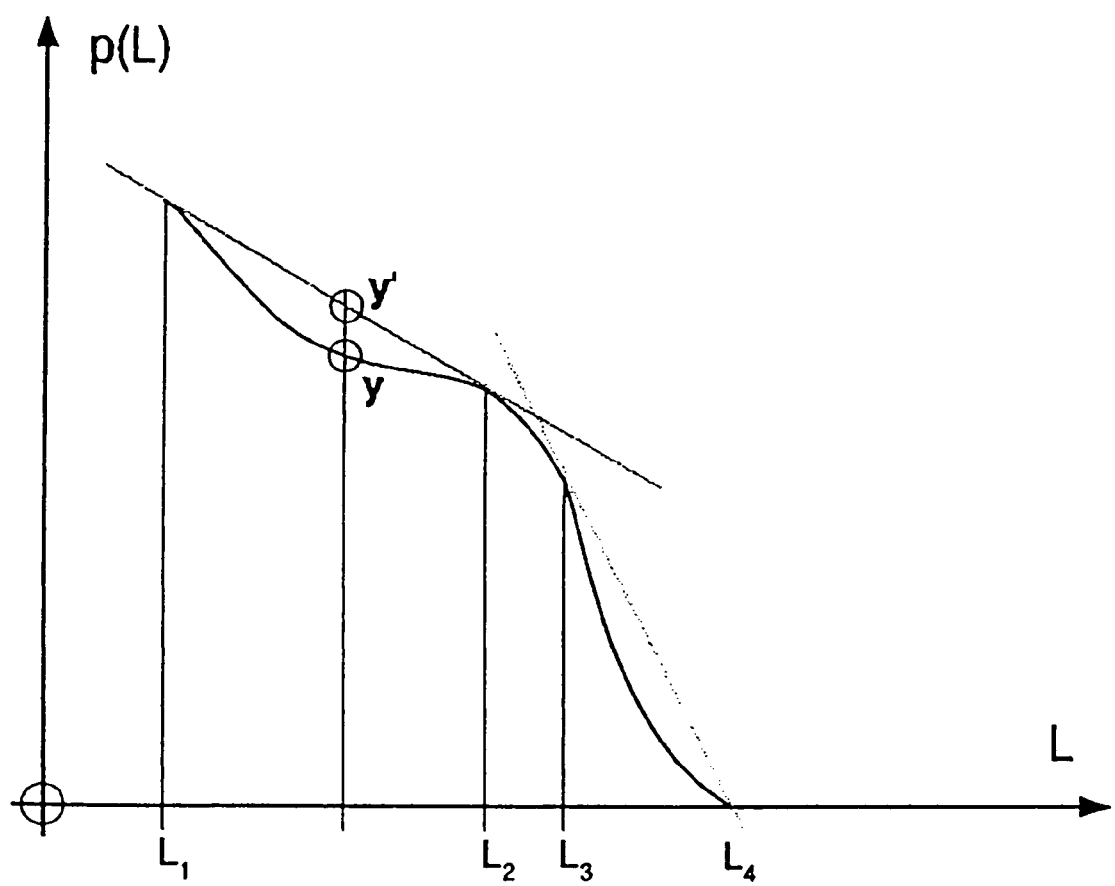
FIG. 9 is a graph showing examples of extremal points.
Figure 10:
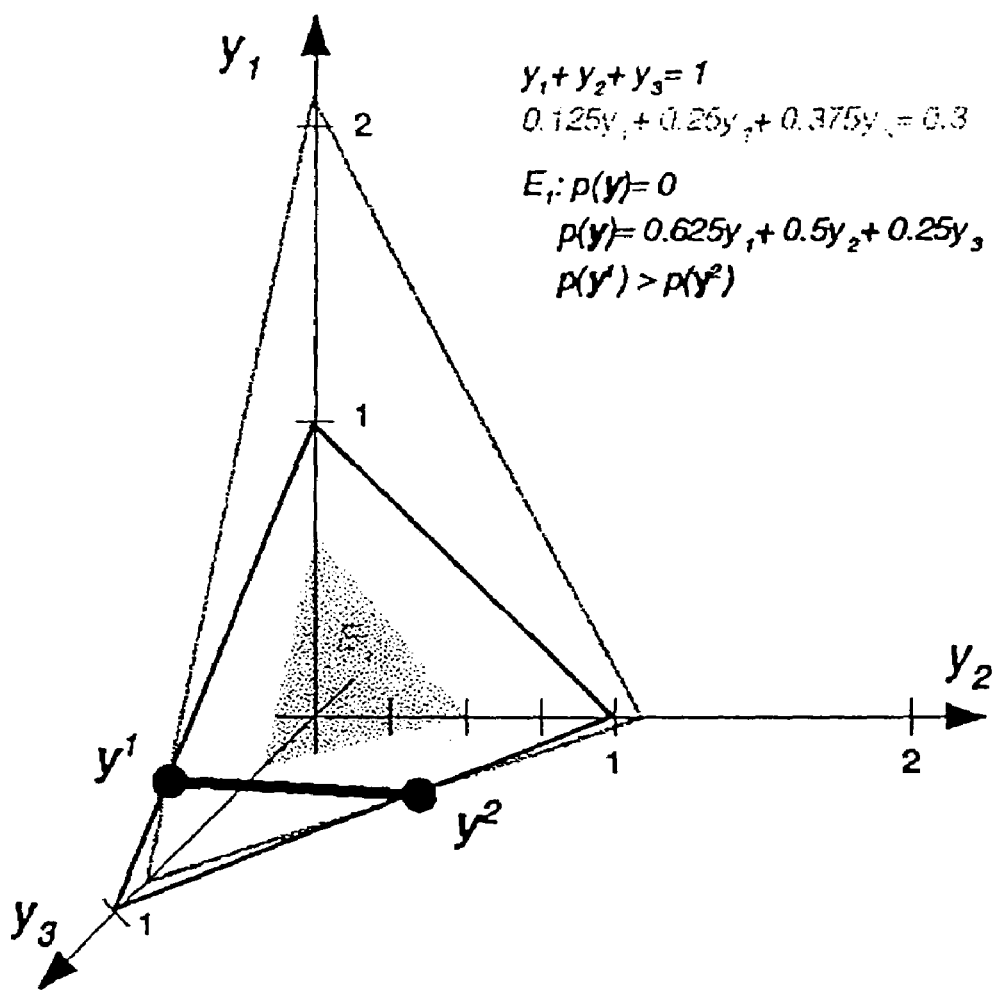
FIG. 10 is a graph of a polyhedron of constant return.

Referring now to FIG. 9, quasi-linearity has the following consequence: Lemma 2: for a quasi-linear risk function, then (i) the efficient frontier 110 is generated by portfolios consisting of one or two classes of SLAs; (ii) a portfolio consisting of one SLA i is efficient only if $(L_i, p_i)$, the loss ratio for the SLA and the unit price for that SLA, constitutes an extremal point on the graph of the price p(L) vs. L, loss ratio shown in FIG. 9, i.e., it lies on the boundary of the curve representing the convex hull in the graph of price vs. loss ratio(therefore, a portfolio of two SLAs, i, and j, is efficient only if $(L_i, p_i)$ and $(L_j, p_j)$ are adjacent extremal points); (iii), supposing that the special function is convex, then there exists a function that assigns to every price vector and risk level greater than or equal to zero, an efficient portfolio of a certain risk consisting of one or two SLAs; and (iv), for a number of SLAs exceeding 2, a function as in "(iii)" cannot be continuous everywhere.

Model 1: Loss

Assuming that the Quality of Service is described by a single parameter, the loss ratio L, defined as the proportion of lost bits to sent bits in a given time interval of duration T, the relations developed above can be illustrated with a real world example, Model 1, in which the network consists of a single link of capacity C. This is useful due to the fact that single links are important as access lines (e.g., an xDSL line connecting a customer site with a central office) and hot spots, and will be discussed in further detail below. Further, the method 10 assumes that the network employees a proportional scheduling service discipline 86a which ensures that whenever the aggregate condition, defined by the total lost traffic being less than or equal to the summation of the product of the loss ratio $L_j$ and the random variable, $X_j$, denoting the traffic sent by customers of class j, holds, the lost traffic for each contract does not exceed the specified loss ratio. Then, assuming further that there exists a random variable Y such that $\Sigma X_i \sim (\Sigma y_i)$ Y and $\Sigma L_i X_i \sim (\Sigma L_i y_i)$ Y, where ~denotes equality in distribution, then the risk function is quasi-linear (depending only on $\Sigma y_i$ and $\Sigma L_i y_i$). Therefore, the conclusions (i) and (ii) of Lemma 2 hold, and one can conclude that the efficient frontier 110 is generated by portfolios consisting of at most two Quality of Service classes $L_i$, $L_j$ corresponding to adjacent extremal points on the price curve.

This is consistent with the findings for simple networks of Kai Cieliebbak and Beat Liver, in their provisional application in which it was shown that the efficient frontier 110 is generated by portfolios consisting of at most two Quality of Service classes, $L_i$, $L_j$, corresponding to adjacent (i.e., a line segment joining them is contained in the boundary of S) extremal points on the price curve of FIG. 9.

In case a network has conceptually a common queue of packets (with respect to the considered Quality of Service parameter), a proportional scheduling policy (with the above-described property) exits and hence Lemma 2 holds. Many broadcast network protocols have this property, so that someone skilled in the art can develop the required proportional scheduling policy. For example, the implementation of this policy for the CSMA/CD (Carrier Sense Multiple Access/Collision Detection) is described as follows. First, each network node has to carry out admission control. Second, a network node uses the standard retransmits protocol for dealing with collisions if the lost traffic for class i exceeds the contracted loss ratio multiplied by the traffic sent by class i (i.e., $Z_i > \Sigma L_i y_i$). Otherwise, packets are not retransmitted.

Figure 11:
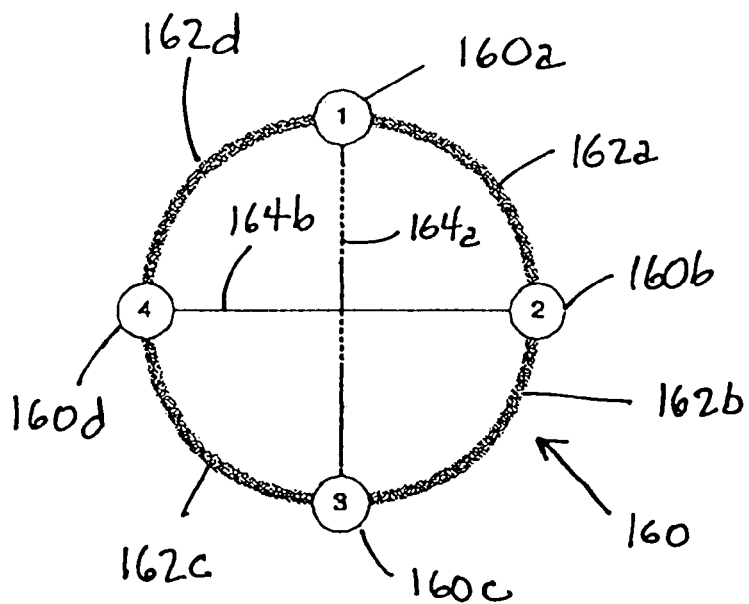
FIG. 11 is a schematic view of an example ring network.
Figure 12:
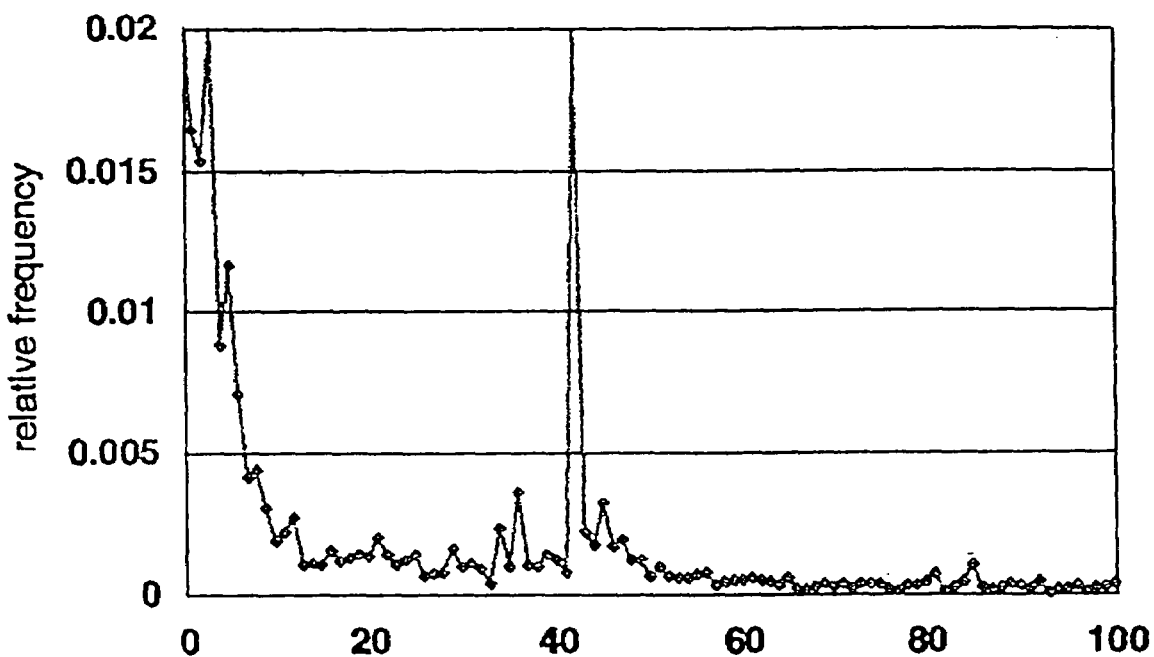
FIG. 12 is a graph of the normalized traffic distribution X.
Figure 13:
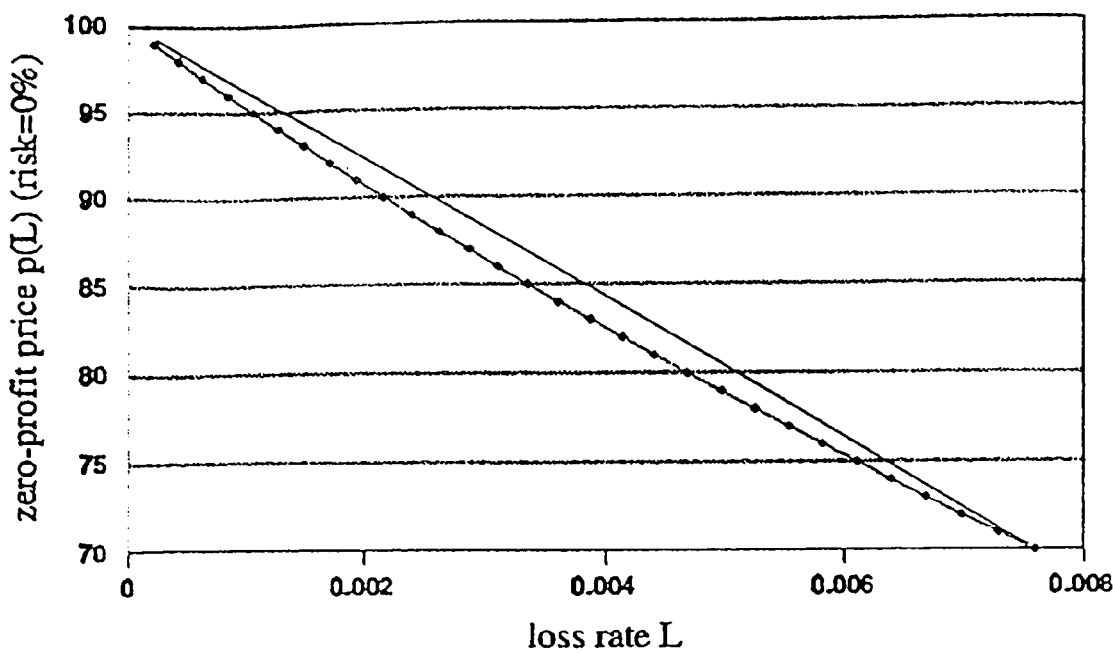
FIG. 13 is a zero-profit price curve.
Figure 14:
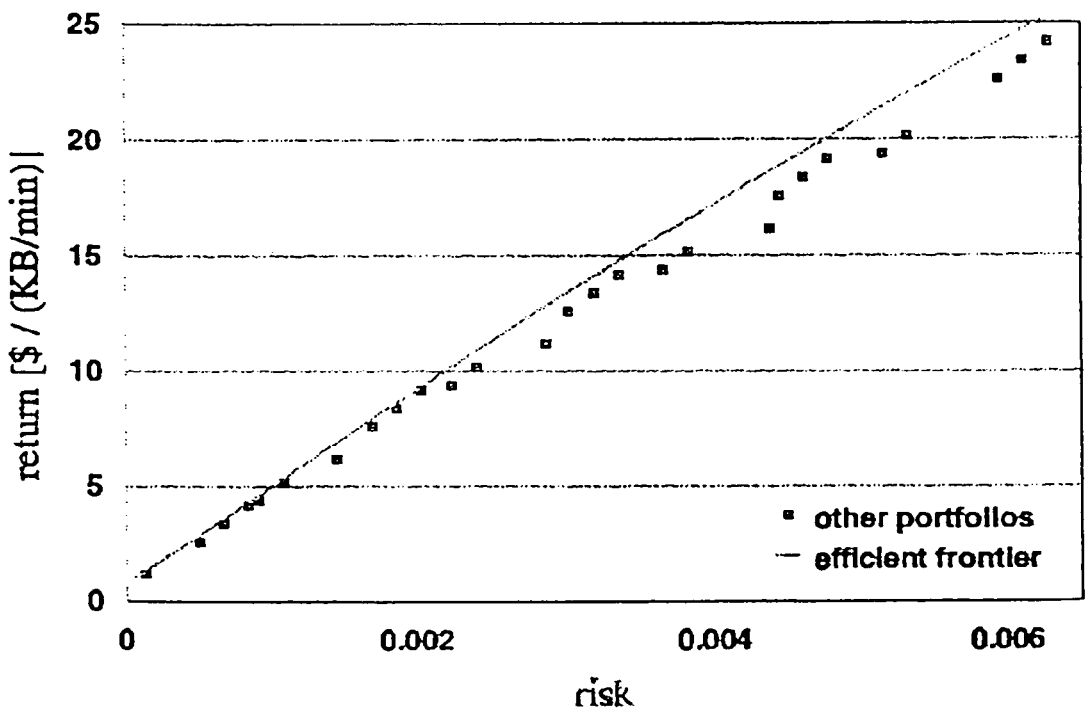
FIG. 14 is a graph of the risk and return of portfolios.

For non-broadcast networks, routing must be taken into account. The results for a single link apply only for special cases in which a network can be treated as a set of independent links. One way this can occur is if multiplexing among different flows is prevented. Another possibility is a highly symmetric topology that makes the network equivalent to independent Links as shown in FIG. 11. A ring network 160 consisting of four nodes 160a, 160b, 160c, and 160d, four links 162a, 162b, 162c, and 162d and two flows 164a and 164b between nodes 160a and 160c, and between 160b and 160d. Flow 164a is equally distributed over the two possible paths for Flow 164b, and vice versa. So, for multiplexing purposes, this network 160 is equivalent to a single link shared by the two flows 164a and 164b. In this figure, a dotted line represents aggregate flows $X^{ij}$. In both paths, all links have the same capacity $c_l$. The capacity of the ring network 160 depends on $X^{4,8}$. If $X^{4,8}$ varies between 0 and $c_l$ and it is routed clock-wise, the capacity available to $X^{1,2}$ and $X^{5,3}$ varies between $c_l$ and 0. Consequently, Z depends on the traffic situation.

Model 1 can be applied to real world networks. Networks fall into two broad categories: broadcast networks (e.g., Ethernet and token ring) and networks using point-to-point connections. Some broadcast networks have conceptually a common queue of packets, i.e., the shared medium may be treated like a single link. For such networks, the equations for noncompliance risk with loss guarantees and expected penalty for loss, given below, apply. In fact, there exists a large number of broadcast networks that can be modeled as a single link. These include Carrier Sense Multiple Access (CSMA), CSMA/CD (Collision Detection)—better known as Ethernet, token buses and rings, wireless networks, and satellite up-links.

Quantify Risk and Return of the Current Portfolio

In the fourth step 66 of method 10, formulas for risk measures are called for. Two specific formulas for quasi-linear risk measures may now be provided. First, the following definitions are made: $y=\Sigma y_i$; $c=C/y$; $L=(\Sigma L_i y_i)y$, and the random distributions are written as $Z=(X-C)^+ \sim (yY-C)^+$ $y(Y-c)^+$, $\Sigma L_i X_i \sim (\Sigma L_i y_i) Y = LY$.

The probability of noncompliance with loss guarantees equals PNL(c, L)

$$=P[Z>\Sigma L_i X_i]=P[(Y-c)^+ - LY>0] \qquad (1)$$

This measure 136 defines the portfolio risk that is the probability that some SLA of the portfolio is violated. Here the pair of variables $(y, \Sigma L_i y_i)$ has been replaced with the equivalent pair (c, L). The probability of noncompliance can be computed from this formula once the distribution of Y is known (e.g., from historical data).

Making the reasonable assumption that the aggregate penalty for noncompliance is proportional to the lost traffic in excess of the SLAs, $Z - \Sigma L_i X_i$, then the expected penalty for loss equals:

$$EPL(c,L)=(\beta C)E[Z-\Sigma L_i X_i], \qquad (2)$$

for some constant $\beta > 0$, so that $(\beta C)$ denotes the penalty per capacity unit.

Model 2: Delay

In this section, a second model, Model 2, is described that is complementary to the previous one, based on the following two basic assumptions, namely, (1) a single link and (2) the Quality of Service is described by a single parameter, the delay D. Assume that the link serves customers of guaranteed delays $D_1 < \ldots < D_n$. As in the preceding sections, the service discipline is activated which customers of class i have strict priority over customers of class j>i (head-of-line), but service in progress is not interrupted (i.e., non-preemptive).

In contrast to the preceding sections, where a general scaling assumption was sufficient, here a specific traffic distribution must be assumed: customers of class i arrive at Poisson rate $\lambda_i$, and the arrival processes are independent of each other. Further, service times are identically distributed and they are independent of each other and of the arrival processes (M/G/1 queuing system).

Under the assumptions that the network consists of one link of capacity C, the Quality of Service is described by a single parameter (the delay D) and the assumption in the above paragraph, the expected penalty for delay, EPD(c,D), is a quasi-linear risk function that is convex. Therefore, conclusions (i) and (iii) of Lemma 2 hold: The efficient frontier 110 is generated by portfolios consisting of at most two Quality of Service classes $D_i$, $D_j$ corresponding to adjacent extremal points on the price curve. Moreover, there exists a function $v^p(p)$ that assigns to every risk $\rho$ and price vector p a portfolio of at most two Quality of Service classes, which is continuous except at price vectors where the set of extremal points changes.

The expected penalty for delay, EPD is computed over a time interval from the formula: EPD (c, L)=$\beta\Sigma\{\lambda_i/\mu\}$(E $[W_i]-D_i)\}=\beta\{(\alpha/(c-1))-(D/c)\}$, where $\beta$ is a constant >0, $c=1/\Sigma(\lambda_i/\mu)$, $D=c\Sigma\{(\lambda_i/\mu)D_i\}$, and $E[W_i]$ denotes the expected waiting time (i.e., delay) for class i. Assuming that class i traffic arrives at Poisson rate $\lambda_i$, and the arrival process are independent of each other; service times, characterized by service rate/of class $\mu$ are independently distributed, and they are independent of each other and of the arrival processes—I.e., an M/G/1 queuing system is assumed. Assuming that the service times for customers of all classes are distributed as a random variable Y of mean $\mu$, then $\alpha=(1+\{Var[Y]/\mu^2\}^2)/2$, where Var[Y] denotes the variance of random variable Y. Note that noncompliance is defined here in terms of a penalty for exceeding $D_i$ and a premium for remaining under $D_i$.

Determine Base-Line Portfolios for (Cost-Based) Zero-Profit Prices

In step 62 of method 10, determining base-line scenarios, is useful to provide insights in the economics of a network's operation. The method 10 optionally calculates a base-line efficient frontier (or portfolio), assuming that there exists sufficient demand for all considered Quality of Service classes. This means that $R^n_+$ defines the set of attainable portfolios. A provider would most likely wish to determine the base-line efficient frontier first. Then, he can investigate which of these portfolios are probably attainable and compare the base-line prices against markets prices (e.g., to determine which Quality of Service classes to offer).

For base lining, the prices $p_i$ can be defined as zero-profit prices at the risk level EPL(C, L)=0—so that profit equals costs—by setting prices proportional to the resource consumption of the services. For this purpose, a provider would calculate for a given risk level $\rho$ and Quality of Service class L, the maximal number of contracts $y_{p,L}$ he can accept. This yields the profit $e=py_{p,L}-p_c C$, so that the zero-profit price is $p=p_c C/y_{p,L}$. The provider is able to offer QoS types profitable if the zero-profit price is equal or lower than market prices. Note that the reverse does not hold, because multiplexing different QoS classes increases often the network utilization and, in turn, reduces the costs. Multiplexing gains (among different QoS types) result in portfolios with e(y)>0. In case that some zero-profit prices are above the market prices, a portfolio y can be considered if the amount e(y) can be used to reduce the prices of contracts that have zero-profit prices above market prices. If a provider calculates the efficient frontier, he would usually eliminate the portfolios from the frontier where he would expect e(y)<0. The reason is that in case e(y)<0, the network exhibits negative multiplexing gains (i.e., the assuming usage pattern cannot be allocated efficiently), the network is not well suited for offering such combinations of QoS classes and, hence, such combinations should not be offered. A prospective provider might calculate the zero-profit prices (i.e., the prices that cover costs) and the resulting base-line efficient frontier. He could then compare these zero-profit prices of SLAs belonging to efficient portfolios with the market prices: if all zero-profit prices associated with each portfolio are, for instance, above the market prices, the provider is not competitive. For a particular portfolio (assuming no other financial subsidies), the losses of due contracts with zero-profit prices that are higher than market prices have to be compensated by profits due to contracts with lower zero-profit prices than market prices.

Derive Strategies to Move Towards a More Efficient Portfolio

Referring again to FIGS. 4 and 7, in order to achieve a more efficient portfolio (depicted by the arrow pointing from the current portfolio P* to the efficient frontier), several options 80 for corrective action are possible. In corrective action 84, a service provider might reduce costs or increase risk. For this purpose, the degree of multiplexing could be increased or the network capacity C decreased. Note that it is sometimes possible to increase the multiplexing without modifying the risk. Such a method is described by Kurz, Thiran, and LeBoudec, in an article entitled Regulation of a connection admission control algorithm in the Proceedings of INFOCOM'99. In corrective action 82, a provider might adopt a marketing strategy to move towards a more efficient portfolio. For instance, the price of the low-quality service could be reduced to increase the number of contracts in this class. In corrective action 92, providers might trade risks (analog to load securitization and syndication): a provider can buy and sell contracts to optimize his portfolio assuming that there exists a market for trading contracts. For trading risks, the operator determines the number of to-be-traded contracts of class i, $\Delta y_i = y_i - y_i^*$, where $y_i^*$ and $y_i$ denote the number of contracts of class i in case of the current portfolio and a desirable (i.e., efficient) portfolio, respectively. If $\Delta y_i > 0$, it's necessary buy $\Delta y_i$ contracts of class i, and if $\Delta y_i < 0$ the provider sells this number of contracts of class i. Note that trading is a corrective action that leads to an efficient portfolio (assuming that the necessary trades can be executed, i.e., that there is adequate supply of SLAs having the appropriate characteristics and a means of purchasing these SLAs).

An advantage of the invention is that it automatically and rapidly calculates risk and estimated performance in transactions involving network service level agreements.

Another advantage of the invention is that the consumer may be offered a wider variety of services at a reduced price, due to the associated reduction of risk brought about by better understanding of risk levels for each class of services offered.

A latitude of modification, change, and substitution is intended in the foregoing disclosure and in some instances, some features of the invention will be employed without a corresponding use of the other features. Accordingly, it is appropriate that the appended claims be construed broadly and in a manner consistent with the scope of the invention.

What is claimed is:

1. A computer-implemented method for utilizing a computer for managing operational risk and return of a production infrastructure with respect to a current portfolio of service-level agreements (SLAs) offered by a service provider, the method comprising:

a. calculating by said computer an efficient frontier that identifies efficient portfolios of SLAs each having a first value of a desired level of risk and return for the service provider using inputs comprising at least one of characteristics of the production infrastructure, traffic characteristics, QoS characteristics, and the price of each class of SLAs;

b. determining a second value of an actual level of risk and return for the service provider under the current portfolio by evaluating performance of the current portfolio of SLAs using a portfolio evaluator means;

c. said computer comparing the second value of the actual level of risk and return for the service provider under the current portfolio and the first value of the desired level of risk and return; and d. identifying and implementing at least one corrective action to dynamically adjust at least one of the characteristics of the production infrastructure, traffic characteristics, QoS characteristics, and price to change the actual risk and return for the service provider to the desired risk and return, based upon the comparing of the second value of actual risk and return and the first value of desired risk and return.

2. The method of claim 1, wherein the corrective action is selected from a group of actions consisting of:

a. adjusting marketing strategy;

b. changing the degree of multiplexing in the network;

c. changing network capacity;

d. changing the cost of network capacity;

e. defining relative compliance guarantees where networks support definition of adequate policies on the basis of priority;

f. changing prices and comparing with baseline prices of SLAs; and g. trading contracts of different classes of SLAs.

3. The method of claim 1 wherein, after corrective action is taken, the method further comprises the steps of:

taking new inputs, and, with the exception of the corrective action of trading SLAs, re-executing the method by calculating a new efficient frontier having a new desired risk and return for comparison with the actual risk and return of the current portfolio, calculated by the portfolio evaluator means.

4. The method of claim 2 wherein, for implementing corrective action comprising trading, the method further comprises:

determining a number of to-be-traded SLAs of a certain class by subtracting the number of SLAs of the certain class in the current portfolio from the number of SLAs in a desired portfolio, and taking action that tends to narrow the difference; thus moving the contents of the current portfolio to that of an optimal portfolio.

* * * * *